M. GALLY.
Mechanical Musical Instruments.
No. 8,856. Reissued Aug. 19, 1879.
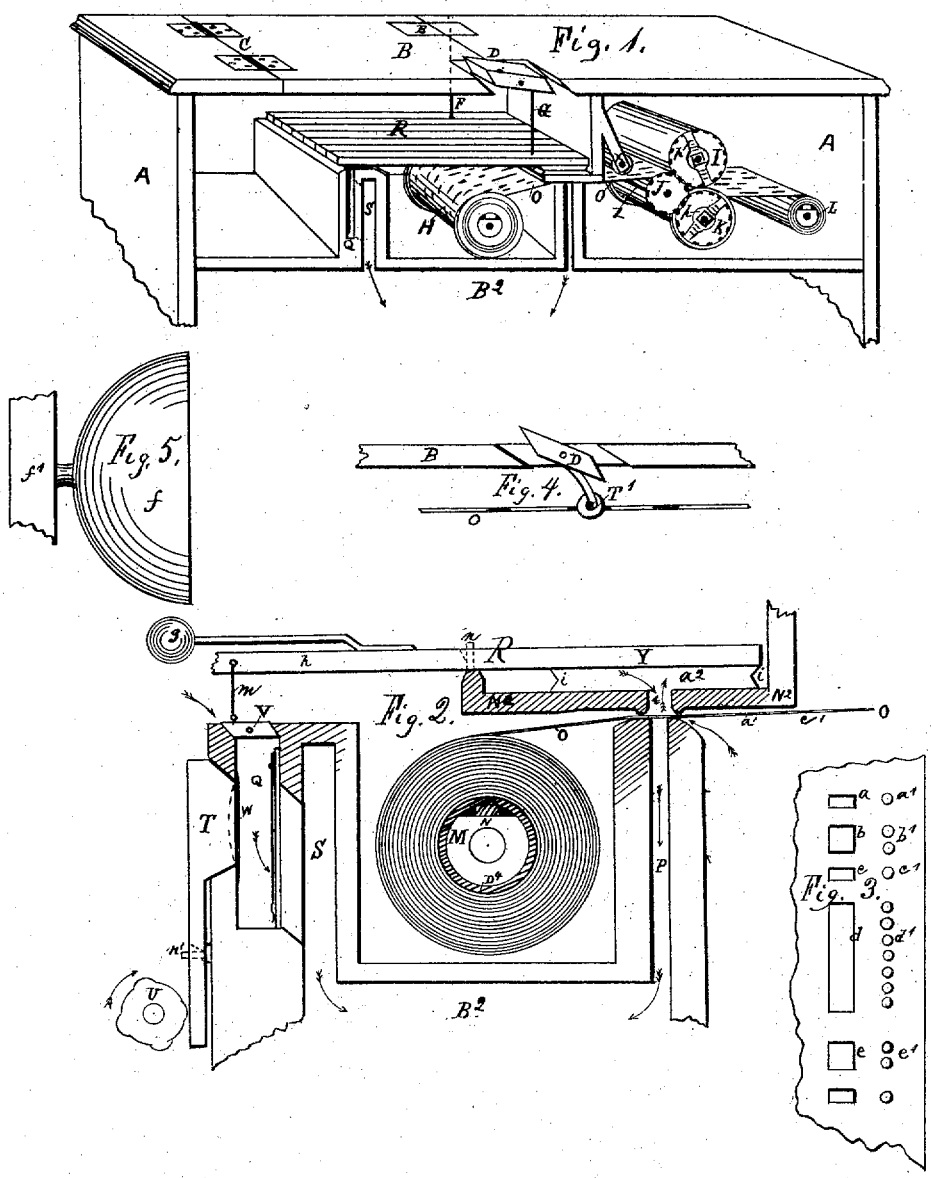
WITNESSES,
John Thomson
O. A. Blough
INVENTOR.
Merritt Gally

UNITED STATES PATENT OFFICE.

MERRITT GALLY, OF NEW YORK, N. Y.

IMPROVEMENT IN MECHANICAL MUSICAL INSTRUMENTS.

Specification forming part of Letters Patent No. 203,257, dated May 7, 1878; Reissue No. 8,856, dated August 19, 1879; application filed May 7, 1879.

*To all whom it may concern:*

Be it known that I, MERRITT GALLY, of New York city and county, and State of New York, have invented certain new and useful Improvements in Musical Instruments; and I do hereby declare that the following is a full and exact description thereof, reference being had to the accompanying drawings and the letters of reference marked thereon.

Figure 1 is a perspective view of the interior of an instrument, showing the new and improved devices. Fig. 2 is a sectional view of the key-action, &c. Fig. 3 represents a piece of the perforated sheet-music, showing the style of perforations constructed for securing the least width of material and the greatest amount of strength and durability to the sheet. Fig. 4 represents a modification of the expression-valve D, shown in Fig. 1. Fig. 5 represents a part of a musical instrument distinct from the pneumatic key-action, in itself considered, but is shown as being acted upon by the pneumatic key-action applied as an attachment to the instrument of Fig. 5.

My invention relates, first, to that class of musical instruments, or attachments for performing mechanically upon musical instruments, which are operated by means of a perforated sheet of paper or other material.

In using perforated music-sheets for automatic instruments, it is a custom to make the sheet in form of an endless belt, as the increasing size of a winding roll, when operated mechanically, is liable to change the "time" of the piece being played.

The first part of my invention consists in such a construction of the mechanism which moves the sheet as to secure to it a regular movement, and to allow only a corresponding winding of the roll. The motor-shaft J may be turned by hand or any suitable motive power. On this shaft is a roller, Z, and above it another roller, X, between which the perforated sheet is drawn by the action of the motor. The motor-shaft J is connected, either by belt, tooth, or friction-gear, to the roller I, upon which roller the sheet is wound after passing between the small rollers X Z. The wheel of roller I turns loosely on the shaft, but is provided with a friction-clutch, which causes it to turn the roller with sufficient force to wind the sheet upon the increasing roll. When the strain upon the sheet is more than sufficient to wind it upon the roll, the wheel I slips under the pressure friction-spring *p* and turns on the shaft. Thus the sheet is collected and wound on the roll I only as fast as it is allowed to pass between the motor-rollers X and Z.

The object of the second part of my invention is to provide for the rewinding of one or more rolls of music mechanically by means of the ordinary motor of the instrument, and also to be able to do this when desirable while music is being performed by the instrument. The winding-roll I and the rewinding-roll K are both driven from shaft J by belt, tooth, or friction-gear, as may be preferred.

After the sheet has been used and wound upon roller I it is necessary to rewind it before it can be used again, or the music would be reversed. In order that this can be done mechanically while another sheet is being rolled at I, the first roll collected at I is placed at L and rewound on roller K while the second sheet is being wound on roller I. Thus there is no interruption in the music from piece to piece, except the simple changing of the position of the rolls, and the several sheets are always mechanically rewound and ready for use.

The third part of my invention consists in a pneumatic key-action, which, in connection with the perforated sheet, can be used not only for operating wind musical instruments, but also those with strings, bells, drums, &c., or any instruments which may be operated by hand or mechanical action.

In Fig. 2 the perforated sheet-music is represented by O O, passing from the roll H.

An air-chest, $B^2$, is used to operate the pneumatic key-action. This air-chest may be the main air-chest, which operates the reeds or pipes of an instrument to which the pneumatic keys are attached, or may be an air-chest simply for the purpose of operating the pneumatic keys, and may be connected with any suitable means for producing a current of air either under pressure or exhaust.

Operating in connection with air-chamber $B^2$ is a supplementary air-chamber, $a^2$, provided with an aperture, *t*. Connected with chamber $a^2$ is a follower, Y, the chamber being made flexible to allow of the free movement of the follower. The music-sheet O passes outside of chamber $a^2$ and aperture $t$.

When a perforation in the music-sheet opens aperture $t$, and also duct P, the air is exhausted, if exhaust is used for chamber $B^2$, and follower Y is depressed, operating its striking or motor key R, for operating the musical instrument.

If the key Y were placed over a chamber only equal in size to the perforations in the sheet, the action of the key would be very weak unless the perforations were very large, which would be impracticable; but by making the chamber $a^2$ much larger in area under the key than the perforation of the sheet, a strong action of the key is produced by the atmospheric pressure upon the entire area of the key above the chamber. After the depression of the key it is returned to place as soon as a portion of the sheet without perforations cuts off the air-passage.

The support $N^2$ for key R Y, which forms the base of the chamber $a^2$, is cut away underneath, so as to have only a slight bearing around the perforation. This base $N^2$ is allowed a slight spring, so that while a perforation is between the opening of the chamber $a^2$ and air-duct P the pressure of the base $N^2$ on the sheet prevents leakage; but as soon as the air-duct is cut off by the sheet the reaction of the base instantly causes leakage to again fill chamber $a^2$, and the leverage of key R Y at $h$ returns the key suddenly to place.

If it is desirable to make the key very light, an ordinary returning-spring—such as is commonly used—may be added.

It would, perhaps, appear on a cursory examination that after the depression of the key the atmospheric pressure on follower Y would hold the base of the chamber down upon its seat; but this is not practically the fact. If the exhaust is suddenly cut off, the reaction of the base of the key $N^2$, together with the reaction momentarily caused in the remaining air of the not entirely exhausted chamber $a^2$, is sufficient to cause leakage between the sheet and the bearing-surfaces at the sides of aperture $t$ to again fill chamber $a^2$. Besides the leakage thus produced, it is increased at one edge of aperture $t$, as follows: The aperture of chamber $a^2$ is flaring or bell-mouthed, and overreaches the sides of the duct P, especially on right-hand side, as shown in the figure.

It will be seen that when a perforation in the sheet has fully passed duct P it is still open to a small part of the aperture of the chamber $a^2$. The sheet is held down over duct P by exhaust only to the edge of the duct, and therefore the air outside and under the sheet passes through the inlet made through the perforation of the sheet, in direction of the waved arrow, into the aperture of the chamber $a^2$. Leakage in this way may be increased, if desired for the purpose, by further overlapping duct P with aperture $t$, and closing the under surface from one side by means of a flap of elastic material, which will draw down and close the opening when affected by the exhaust of duct P, but will immediately open on the reaction when the exhaust is cut off.

In the pneumatic key, as described, air passes through the music-sheet, not only to exhaust the key, but also in the opposite direction to fill chamber $a^2$ for a quick return of the key.

If a pressure-current is used instead of exhaust, the action of the key will be reversed.

It will be seen that with a sufficient number of keys R Y any kind of musical instrument can be played, either forming part of the entire mechanism, or as an attachment to ordinary instruments such as pianos, organs, dulcimers, drums, bells, &c.

In Fig. 2 the key R Y is represented as operating the valve V of the reed of an organ. Strings, drums, trumpets, bells, or any other kind of instrument might be added as a combination, as any of them can be performed upon by or through the means of lever-keys, as is well known.

Fig. 5 represents one of the bells of a bell-piano as a distinct instrument, which is performed upon by the strokes of the lever-keys as an attachment, and the pneumatic key-action can thus be attached to any instrument operated by similar movements. When inverted, the key-action, striking downward, is easily applied to the finger-board of any ordinary keyed instrument.

In using the sheet O for operating the pneumatic keys R, the perforations corresponding to $c$ and $d$ are not required to be an elongated single opening to produce a long tone, but can be made as shown by $c'$ $d'$—a number of small perforations near together. So long as they are near enough together for any part of one or the other to remain over the opening of duct P the key will remain depressed. When the perforations $a^1$ $b'$ are separated sufficiently to produce a cut-off by the intervening material, two distinct movements of the key are produced, corresponding to $a$ $b$.

One of the advantages of the pneumatic key-action is, that it will work perfectly and strongly with perforations in the sheet so small that if used directly over the reeds they would not produce any tone whatever. This also allows of a much narrower sheet being used, as a greater number of lines of openings can be made in the width of sheets commonly used.

The fifth part of my invention consists in the peculiar construction of a voice-tremolo. The ordinary valve-tremolo produces a bubbling sound and deadens the tone, not imitating the tremolo of the human voice. The fan-tremolo is also defective in this respect. The tremolo of the human voice is produced by a rapid contraction and expansion alternating in the walls of the passage to the larynx, but the free and clear passage of the tone is not obstructed.

To imitate this tremolo I make an opening in the side of the air-duct Q, Fig. 2, and cover this opening with a flexible wall, W. To the outside of the wall I attach the vibrating motor T. When the vibrator is thrown to the dotted line the air in the duct is suddenly expanded, and again condensed on the return of the vibrator. The tremolo is thus produced without in the least obstructing the duct, and the tremolo of the voice is closely imitated in a clear, full tone. The vibrator T may be operated by wind-wheel, or by any mechanical action that will produce a simple vibrating motion.

The sixth part of my invention consists in a mechanism operated by perforations in the music-sheet to produce expression of tone—as very soft, soft, loud, very loud, &c. The reeds, cords, bells, or other musical devices are inclosed to shut in the sound in a similar manner as arranged for the swell of an ordinary cabinet-organ.

In Fig. 1 two valve doors or swells, D E, are shown. These, instead of being operated by hand, are attached to pneumatic keys, to be operated by means of perforations in the music-sheet, according to the required expression. A modification of this device is shown in Fig. 4, in which the swell or door is operated by a lever, the end of which rides upon the surface of the sheet, except as it meets with perforations, depressions, or elevations indicating the change of expression.

The next part of my invention consists in attaching to a music-sheet a roller, on which the sheet or strip is rolled, and adapting the roller by means of a stop or other suitable connecting device to be connected with the driving mechanism of a musical instrument, or the kind of instrument for which the sheet is intended.

The market can thus be supplied with music-sheets adapted to any particular kind of instrument and ready to be inserted in connection with its motor.

I provide the end of the roller with a clutch, spline, or other suitable device, which will so connect it with the journals of the instrument as to secure its turning with the journals in order to properly roll or rewind the sheet, as the case may be. When it is desirable to make these rollers very light, I make them in tubular form, with the stop or clutch N attached to the tube, or a corresponding recess instead thereof. The rollers are made of proper length to accommodate the width of the music-sheet, and also to properly fit the journal or shafts of the instrument.

When desirable I make the roller for the sheet from the material of the sheet rolled upon itself, with paste or other adhesive substance, until it is sufficiently strong to form a substantial roller. This is a cheap and simple manner of construction.

The pneumatic key-action may be otherwise than mechanically operated, or it may be used for general purposes, aside from musical instruments, for producing mechanical movements or operating certain parts of instruments, or for machines, such as looms, &c., according to arranged plans or intervals. I however reserve this matter for another specification.

This part of my invention as applied in the present case consists of four essential elements—a main air-chamber, a supplementary air-chamber provided with an aperture, and a perforated music-sheet, through the perforations of which air passes, and a follower which furnishes the required movement. As these elements are subject to various arrangements and modified constructions without materially changing the gist of my invention, I wish not to confine myself to the exact construction and arrangement shown, but to claim, broadly, the combination of these essential elements to produce the result, as in this lies the gist of my invention.

What I claim as my invention is—

1. A pneumatic key for a musical instrument, or an attachment for performing on musical instruments, having an air-chamber provided with an aperture for the passage of air, the key being operated by means of a perforated music sheet or strip through which air passes when a perforation in the sheet or strip corresponds with the aperture of the chamber.

2. An air-chamber of a pneumatic key provided with an aperture, outside of which chamber a traveling perforated music-sheet passes, the perforated and unperforated portions of the sheet alternately opening and closing the aperture of the chamber to produce the proper action of the key.

3. In a pneumatic key-action which is operated by means of a perforated music sheet or strip, the combination, with a reed-chamber or a main air-chamber, of a supplementary air-chamber and a follower, the supplementary air-chamber being provided with an orifice or aperture, outside of which the perforated sheet passes to produce the action of the follower.

4. In a pneumatic key-action, the combination, with a reed-chamber or a main air-chamber, of a supplementary air-chamber provided with an orifice or aperture, outside of which a perforated music sheet or strip travels, a quick return movement of the follower or key of the action being produced by means of air passing through the perforations of the sheet or strip.

5. A pneumatic key-action operated by means of air passing through the perforations of a music sheet or strip when used to operate or perform directly or indirectly upon reeds, strings, bells, pipes, stops, or other devices for producing or affecting musical tones.

6. The combination, with an air-passage of a musical instrument, of a perforated music-sheet in which perforations for the passage of air through the sheet, arranged in a single group, represent a single continuous tone, substantially as specified.

7. A pneumatic key-action provided with an air-chamber and a follower, the air-chamber having an inlet adapted to be closed, or a loose joint between the air-chamber and air-duct adapted to be held closed by atmospheric pressure during the continuance of the exhaust, but which is thrown open by the momentary counteraction of such pressure by the recoil when the exhaust is suddenly cut off.

8. In a mechanical musical instrument, or an attachment for operating musical instruments, wherein a traveling music sheet, strip, or band is employed to produce the notes, a music-sheet having, in connection with the means for operating the sound-producing devices, auxiliary means constructed and adapted to operate automatically the stops and expression devices, or either, substantially as specified.

9. The swell or door, (one or more,) in combination with a pneumatic key or keys for operating the same.

10. A perforated music sheet or strip to which a roller is attached, which is adapted to be connected with the driving mechanism of a musical instrument, or an attachment for performing upon musical instruments.

11. A music sheet or strip provided with a roller and a stop or clutch for connecting it with the driving mechanism of a musical instrument.

12. The combination, with the motor for moving a perforated or other music-sheet, of a slipping gear, which causes the winding of the roll to correspond with the proper movement of the sheet.

13. The combination, with a musical instrument and a perforated music-sheet, of a rewinding mechanism, which is operated by the motor of the instrument, caused to perform the rewinding when required.

14. The combination, with a musical instrument and perforated or other music-sheet, of a rewinding mechanism, which is operative while music is being performed by the instrument.

15. The tubular roller attached to or formed of a portion of the music-sheet, substantially as and for the purpose specified.

16. In a musical instrument, the tremolo, consisting of a flexible wall of the air-duct to or from the reed or pipe of a wind musical instrument, and a vibrator for vibrating the flexible wall, substantially as specified.

17. The combination, with a perforated sheet or strip in which the perforations are made to represent sounds, and a feed mechanism for propelling the same, of a take-up roll having a slipping driving device, for the purpose specified.

18. The combination, with the perforated sheet or strip, and a feed mechanism for propelling the same, of a take-up roll having a slipping driving device, and a spring-tension for regulating the same.

MERRITT GALLY.

Witnesses:
JOHN THOMSON,
O. A. CLOUGH.